June 12, 1923.
A. H. NELLER
GUIDE FOR HOISTING WHEELS
Filed June 30, 1922
1,458,354
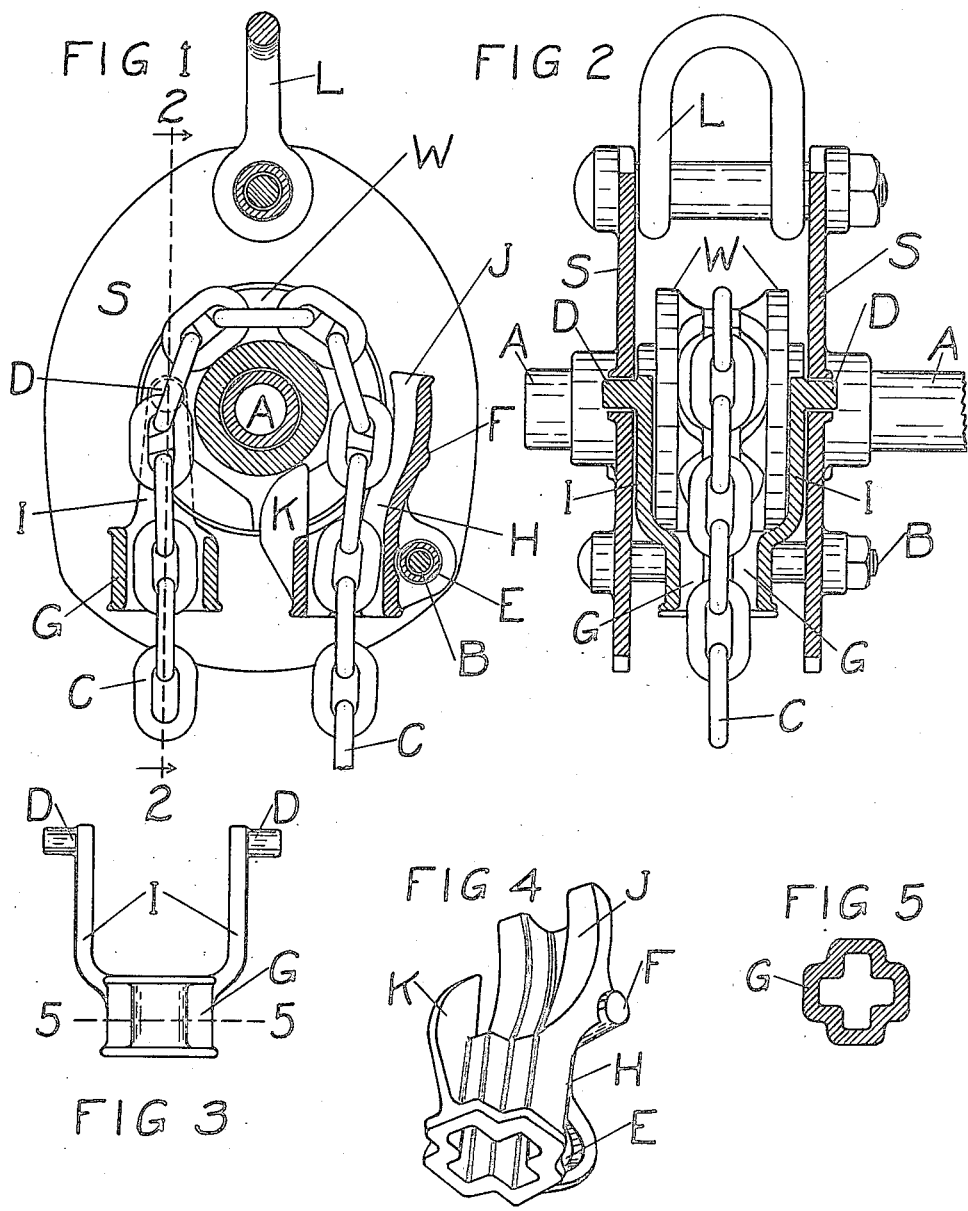
INVENTOR
Albert H. Neller,
William Louden,
ATTORNEY Patented June 12, 1923.

1,458,354

UNITED STATES PATENT OFFICE.

ALBERT H. NELLER, OF FAIRFIELD, IOWA, ASSIGNOR TO THE LOUDEN MACHINERY COMPANY, OF FAIRFIELD, IOWA, A CORPORATION OF IOWA.

GUIDE FOR HOISTING WHEELS.

Application filed June 30, 1922. Serial No. 571,970.

*To all whom it may concern:*

Be it known that I, ALBERT H. NELLER, a citizen of the United States, residing at Fairfield, in the county of Jefferson and State of Iowa, have invented a new and useful Improvement in Guides for Hoisting Wheels, of which the following is a specification.

My invention relates to guides designed to prevent a hoisting chain from approaching the hoisting wheel in a twisted or kinky condition, and also, to assist in conducting the chain away from the wheel after passing over it; and it consists of an improved construction and arrangement of the guides which will be described herein and will be more specifically set forth in the claims.

In the accompanying drawings forming a part of this specification, Fig. 1 is a vertical section drawn through the longitudinal center of a hoisting wheel having guides embodying my invention, a side view being shown of the portion of the chain passing over the wheel. Fig. 2 is a transverse section on line 2—2 of Fig. 1 looking in the direction of the arrow, the cut away portions of the wheel and guides being replaced to make the structure complete, and a side view being shown of the chain and the wheel. Fig. 3 is a side view of one of the guides and Fig. 4 is a perspective of the other. Fig. 5 is a horizontal section on line 5—5 of Fig. 3.

Referring to the drawings, S represents sides forming a frame of a hoisting wheel, which may be fitted with a supporting link L. An axle A is passed through, or may be journaled in the frame, and upon this axle, a wheel W is mounted between the sides of the frame. The axle may be tubular, as shown in Fig. 1, or be of solid metal, if preferred. The wheel W is fitted to receive and hold in contact therewith the links of a chain C, whereby when the wheel is rotated the chain will be carried over it without slipping thereon. Within the frame and adjacent to the wheel, but on opposite sides, two chain guides, G and H, are mounted, and the chain C is passed through openings in the bodies of these guides.

The guide G is set on the elevating side of the wheel, and is provided with a pair of upwardly extending, approximately parallel arms I, which are passed up on opposite sides of the chain on that side of the wheel, and the upper ends of the arms are pivoted in the opposite sides of the frame approximately in line with the vertical center of the chain and approximately on a level with the horizontal center of the wheel, or preferably, a little above said center, as shown by dotted lines in Fig. 1, and by cross section lines in Fig. 2. Laterally outstanding bosses or lugs D may be formed on the upper ends of the arms, which are adapted to enter holes in the adjacent sides of the frame and thereby form pivots for the guide G.

The guide H, which is set on the opposite side of the wheel, is fitted with an upwardly extended portion J having a vertically disposed groove in its center and an upwardly extended finger K, on its opposite side, which is adapted to stand in the under side of the groove of the wheel, through which the chain is passed. The guide H may be held in place by a bolt B, passed through an eye E in one side of its lower end, as most plainly shown in Fig. 1.

A lug F on the side of the guide H (preferably a lug on each side), may also be used to assist in holding it in position by having its end inserted in a suitable recess in the adjacent side S of the frame, as will be readily understood by those skilled in the art. By this means the member H will be held in a substantially fixed position in close proximity to the wheel, but will not be permitted to come into direct contact with it, thus obviating frictional contact therewith. The opening in the body of each of the guides, is cross shaped, as most plainly shown in Fig. 5, to loosely fit the contour of the chain, and the upper and lower edges are preferably rounded so the chain will pass freely through the openings.

In operation, the load to be elevated (not shown) is attached to the end of the chain below the guide G. Power being applied, which may be done in any suitable manner known to the art, either to the wheel or to the opposite end of the chain, the chain carrying the load will be drawn up through the guide G, and over the wheel W and then down through the guide H. If the chain should become twisted, either by the load swinging around, or in any other way, the guide G will straighten it before it comes in contact with the wheel, and the chain will always approach the wheel in the proper position to pass freely over it and will not be twisted, as it would be liable to be if it was not straightened, by the guide.

If the end of the chain carrying the load should be swung over to one side so it would not be perpendicular or the frame of the wheel should be tilted over to one side, the guide G will be free to swing on its pivots D to an equal extent, and having the upstanding parallel arms pivoted in opposite sides and transversely in line with the center of the chain approximately on a level with the horizontal center of the wheel, the guide will always be in line with the chain, and the chain will never become cramped therein, as it would be liable to if the guide was not pivoted in alignment with the chain. Also, having the two upstanding arms and two separate pivots, the guide will be stronger than if it had only one arm and one pivot, and in every way, it will be better proportioned.

The guide H on the opposite side is arranged to receive the chain after it passes over the wheel, to conduct it downwardly away from the wheel, and to prevent it from sticking therein, as it might do especially when the power is applied to the wheel and this end of the chain is slack. The groove in the upstanding end J is adapted to receive the outstanding edges of the links of the chain and to conduct them down through the body of the guide, while the upstanding finger K on the opposite side is adapted to prevent the inner edges of the links from sticking in the groove, and from being carried under the wheel by friction in the groove.

In returning the chain for another load, if the portion under the guide H should become twisted or kinked it will be straightened by the guide before it reaches the wheel, but as this part of the chain will then be partly slack, if not entirely slack, it will easily accommodate itself to the fixed vertical position of the guide and therefore there will be no necessity of pivoting the guide H as there is of pivoting the guide G. If the axle A should be used to rotate the wheel it will have to be journalled in the frame and rigidly secured to the wheel, but if the hoisting means should be connected to the free end of the chain or other means should be used to rotate the wheel, the shaft may then be journalled in the wheel and be rigidly secured to the frame, as will be readily understood by those skilled in the art.

What I claim is:

1. In guides for hoisting wheels in which an elevating chain is used, a frame for the wheel having opposite sides, a straitening member having an opening in its body to fit the contour of the chain, and through which the elevating portion of the chain is passed, whereby in passing, it will be straitened, if twisted, before being drawn on to the wheel, and upstanding approximately parallel arms on opposite sides of the straitening member, said arms being pivoted in opposite sides of the frame approximately in line with the transverse center of the chain where it comes in contact with the wheel.

2. In guides for hoisting wheels in which an elevating chain is used, a frame for the wheel having opposite sides, a straitening member having an opening in its body to fit the contour of the chain, and through which the elevating portion of the chain is passed, whereby in passing, it will be straitened, if twisted, before being drawn on to the wheel, upstanding approximately parallel arms on opposite sides of the straitening member, laterally outstanding bosses on the upper ends of said arms, said bosses being inserted in holes in opposite sides of the frame, and forming pivots for the straitening member approximately in line with the transverse center of the chain where it comes in contact with the wheel.

3. In guides for hoisting wheels in which an elevating chain is used, a frame for the wheel having opposite sides, a detaching member located in the frame adjacent to the wheel where, in elevating, the chain descends after passing over the wheel, a vertically disposed opening in the body of said member to fit the contour of the chain, an upstanding portion on the outer side above the body of the member approximately level with the wheel to conduct the descending chain into the opening of the member, and an upstanding finger on the inner side of the body of the member between the chain and the part of the wheel with which the chain is in contact, whereby the descending chain will be prevented from sticking to the wheel.

ALBERT H. NELLER.